(12) United States Patent
Kim et al.

(10) Patent No.: US 10,237,093 B2
(45) Date of Patent: Mar. 19, 2019

(54) METHOD AND APPARATUS FOR PIC CHANNEL ESTIMATOR CONSIDERING WEIGHT

(75) Inventors: Hyun-Cheol Kim, Suwon-si (KR);
Sung-Kwon Jo, Suwon-si (KR);
Myung-Kwang Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 777 days.

(21) Appl. No.: 13/288,762

(22) Filed: Nov. 3, 2011

(65) Prior Publication Data
US 2012/0113973 A1 May 10, 2012

(30) Foreign Application Priority Data
Nov. 4, 2010 (KR) .................. 10-2010-0109007

(51) Int. Cl.
H04B 1/707 (2011.01)
H04L 25/02 (2006.01)
H04B 1/7107 (2011.01)

(52) U.S. Cl.
CPC ..... *H04L 25/0202* (2013.01); *H04B 1/71072* (2013.01); *H04B 2001/70724* (2013.01); *H04L 25/0212* (2013.01); *H04L 25/0256* (2013.01)

(58) Field of Classification Search
None
See application file for complete search history.

(56) References Cited

U.S. PATENT DOCUMENTS

| | | | |
|---|---|---|---|
| 6,192,067 B1 * | 2/2001 | Toda | H04B 1/71075 375/140 |
| 6,459,693 B1 * | 10/2002 | Park et al. | 370/342 |
| 6,707,788 B1 * | 3/2004 | Kim | H04B 1/707 370/203 |
| 6,741,634 B1 * | 5/2004 | Kim | H04L 25/03057 370/335 |
| 7,280,467 B2 * | 10/2007 | Smee | H04B 7/0669 370/208 |
| 7,376,210 B2 * | 5/2008 | Kim | H04L 25/0202 342/99 |
| 8,699,644 B1 * | 4/2014 | Sun | H04L 27/2647 370/206 |
| 2001/0030993 A1 * | 10/2001 | Bottomley et al. | 375/148 |
| 2002/0024994 A1 * | 2/2002 | Piirainen et al. | 375/231 |
| 2002/0051433 A1 * | 5/2002 | Affes et al. | 370/335 |
| 2002/0131479 A1 * | 9/2002 | Butler | H04B 1/7107 375/147 |
| 2002/0191580 A1 * | 12/2002 | Ishii et al. | 370/342 |
| 2003/0161387 A1 * | 8/2003 | Ouvry | H04B 1/707 375/142 |
| 2003/0185174 A1 * | 10/2003 | Currivan et al. | 370/335 |
| 2004/0076185 A1 * | 4/2004 | Kim | H04L 25/0202 370/488 |
| 2004/0091021 A1 * | 5/2004 | Arima | H04B 1/7113 375/147 |

(Continued)

*Primary Examiner* — Alpus Hsu
*Assistant Examiner* — Hooman Houshman (57) ABSTRACT

A method and an apparatus apply an adaptive weight in a wireless communication system. In the method, channel estimation is performed. A weighting factor that reduces a Mean Square Error (MSE) is determined with respect to a channel in a specific section. A channel estimate value is multiplied by the weighting factor.

10 Claims, 5 Drawing Sheets

(56) References Cited

U.S. PATENT DOCUMENTS

| | | | |
|---|---|---|---|
| 2004/0120304 A1* | 6/2004 | Kloos | H04B 7/2643 370/347 |
| 2004/0131007 A1* | 7/2004 | Smee | H04B 7/0669 370/208 |
| 2005/0002445 A1* | 1/2005 | Dunyak | H04B 1/71075 375/148 |
| 2005/0025110 A1* | 2/2005 | Becker | H04B 1/712 370/342 |
| 2005/0025225 A1* | 2/2005 | Niederholz | H04B 1/7115 375/148 |
| 2006/0013289 A1* | 1/2006 | Hwang | H04B 1/71075 375/148 |
| 2006/0270358 A1* | 11/2006 | Ling | H04W 52/12 455/67.11 |
| 2007/0111664 A1* | 5/2007 | Levin | H04B 1/7107 455/63.1 |
| 2008/0123719 A1* | 5/2008 | Lee | H04B 1/71075 375/148 |
| 2009/0268786 A1* | 10/2009 | Matsumoto | H04B 1/71052 375/148 |
| 2010/0272199 A1* | 10/2010 | Hayashi | H04B 7/10 375/260 |
| 2011/0158302 A1* | 6/2011 | Kim | H04L 1/0048 375/224 |

* cited by examiner

METHOD AND APPARATUS FOR PIC CHANNEL ESTIMATOR CONSIDERING WEIGHT

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Nov. 4, 2010 and assigned Serial No. 10-2010-0109007, the entire disclosure of which is hereby incorporated by reference.

TECHNICAL FIELD OF THE INVENTION

The present invention relates to a method and an apparatus for applying an optimized adaptive weight to an output of a channel estimator in order to raise accuracy of the channel estimator used for estimating a channel gain in a Pilot Interference Canceller (PIC).

BACKGROUND OF THE INVENTION

A Code Division Multiple Access (CDMA) communication system uses a PIC technology that cancels a pilot in order to improve a cell performance of an uplink.

However, a weight determining method used in the PIC cannot have an optimized performance in an aspect of a Mean Square Error (MSE).

That is, since the weight determining method used in the PIC has a structure that uses a constant weighting factor, the method cannot apply an instantaneously optimized weighting factor and so an MSE gets large.

Therefore, a method and an apparatus that can apply an instantaneously optimized weighting factor are required.

SUMMARY OF THE INVENTION

To address the above-discussed deficiencies of the prior art, it is a primary aspect of the present invention is to provide a method and an apparatus for a PIC channel estimator considering a weight.

Another aspect of the present invention is to provide a method and an apparatus for improving a performance of a channel estimator by applying a weighting factor that uses a weight algorithm having a minimum (or reduced) Mean Square Error (MSE) in a short term average to an output of the channel estimator in a CDMA communication system.

In accordance with an aspect of the present invention, a method for applying an adaptive weight in a wireless communication system is provided. The method includes performing channel estimation, determining a weighting factor that reduces a Mean Square Error (MSE) with respect to a channel in a specific section, and multiplying a channel estimate value by the weighting factor.

In accordance with another aspect of the present invention, an apparatus for applying an adaptive weight in a wireless communication system is provided. The apparatus includes a channel estimator for performing channel estimation, and a weighting block for determining a weighting factor that reduces a Mean Square Error (MSE) with respect to a channel in a specific section, and multiplying a channel estimate value by the weighting factor.

In accordance with still another aspect of the present invention, a method for canceling a pilot interference in an uplink of a Code Division Multiple Access (CDMA) communication system is provided. The method includes over-sampling a received sample, generating a Pseudo Noise (PN) sequence, despreading the over-sampled sample by a Spreading Factor (SF) to generate a signal of a symbol basis, performing channel estimation on the signal of the symbol basis, and determining a weighting factor reducing a Mean Square Error (MSE) with respect to a channel in a specific section and multiplying a channel estimate value by the weighting factor.

In accordance with further another aspect of the present invention, an apparatus for canceling a pilot interference in an uplink of a Code Division Multiple Access (CDMA) communication system is provided. The apparatus includes an interpolator for over-sampling a received sample, a Pseudo Noise (PN) generator for generating a Pseudo Noise (PN) sequence, a despreader for despreading the over-sampled sample by a Spreading Factor (SF) to generate a signal of a symbol basis, a channel estimator for performing channel estimation on the signal of the symbol basis, and a weighting block for determining a weighting factor reducing a Mean Square Error (MSE) with respect to a channel in a specific section and multiplying a channel estimate value by the weighting factor.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for a PIC channel estimator considering a weight.

Exemplary embodiments of the present invention use a PIC that cancels a pilot in order to improve a cell performance of an uplink in a CDMA system.

Figure 1:
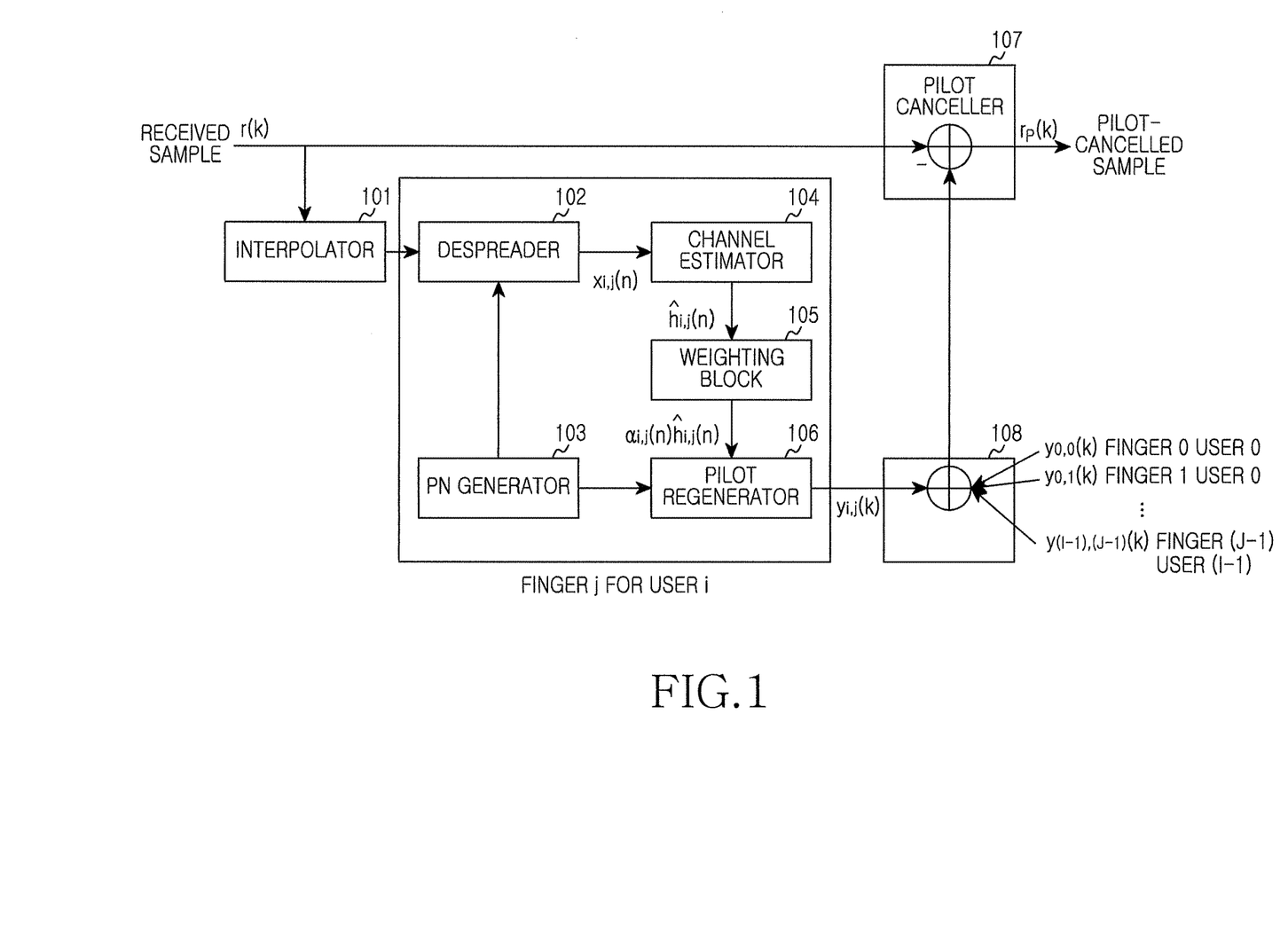
FIG. 1 is a view illustrating a general PIC structure applied to an uplink of a CDMA communication network according to an exemplary embodiment of the present invention.

FIG. 1 is a view illustrating a general PIC structure applied to an uplink of a CDMA communication network according to an exemplary embodiment of the present invention.

Referring to FIG. 1, the PIC includes an interpolator 101, a despreader 102, a Pseudo Noise (PN) generator 103, a channel estimator 104, a weighting block 105, a pilot regenerator 106, a pilot canceller 107, and a summation 108.

The interpolator 101 over-samples a received sample r(k) by I time. Here, "I" denotes an over-sampling ratio of the interpolator 101.

The PN generator 103 generates a PN sequence used for an i-th user to provide the same to the despreader 102 and the pilot regenerator 106.

The despreader 102 despreads a signal received from the interpolator 101 by a Spreading Factor (SF) to generate a signal $x_{i,j}(n)$ of a symbol basis and provides the generated signal to the channel estimator 104.

The channel estimator 104 filters the signal $x_{i,j}(n)$ provided by the despreader 102 to generate an estimated channel gain $\hat{h}_{i,j}(n)$ and provides the same to the weighting block 105.

Figure 2:
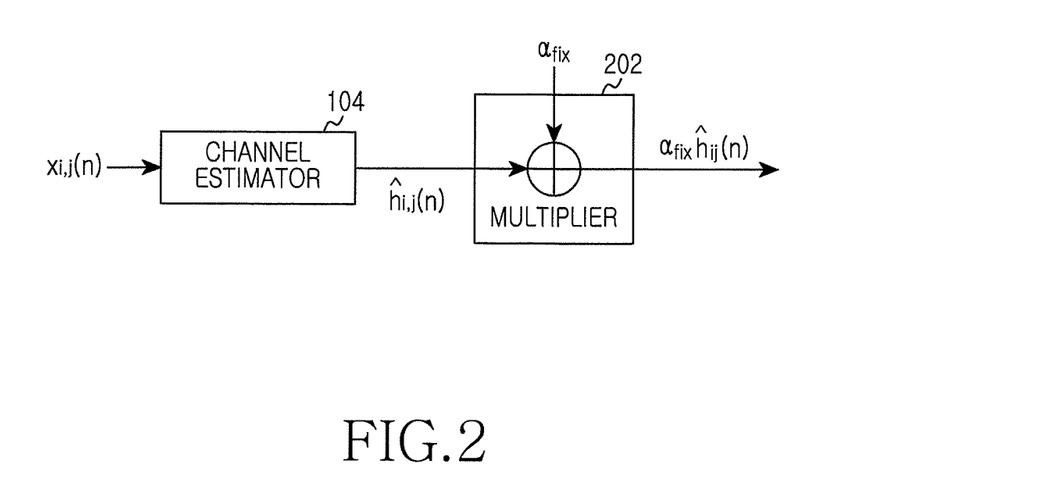
FIG. 2 is a block diagram illustrating a weighting block according to an exemplary embodiment of the present invention.

The weighting block 105 applies a weight to an estimated channel gain $\hat{h}_{i,j}(n)$ by a generated weighting factor. An example of a weighting factor generating block used for a general PIC is illustrated in FIG. 2. A channel estimate value $\alpha_{f_\alpha}\hat{h}_{i,j}(n)$ to which a weight has been applied using a constant weighting factor $\alpha(n)=\alpha_{f_\alpha}$ as in FIG. 2 is provided to the pilot regenerator 106.

The pilot regenerator 106 generates a pilot $y_{i,j}(k)$ to be cancelled every user using a channel estimate value $\alpha_{i,j}(n)\hat{h}_{i,j}(n)$ to which a weight has been applied, a pilot pattern, and a PN sequence.

The summation 108 sums all of pilots $y_{i,j}(k)$ of every user generated by the pilot regenerator 106 and provides the same to the pilot canceller 107.

The pilot canceller 107 cancels pilots $y_{i,j}(k)$ of every user from a received signal r(k) to generate a sample $r_p(k)$ where a pilot has been cancelled.

FIG. 2 is a block diagram illustrating a weighting block according to an exemplary embodiment of the present invention.

Referring to FIG. 2, the weighting block includes a multiplier 202. The multiplier 202 multiplies a received channel estimate value of the channel estimator 104 and a constant weighting factor $\alpha(n)=\alpha_{f_\alpha}$ and outputs a result value $\alpha_{f_\alpha}\hat{h}_{i,j}(n)$.

The weighting block provides the channel estimate value $\alpha_{f_\alpha}\hat{h}_{i,j}(n)$ to which a weight has been applied to the pilot regenerator 106.

Figure 3:
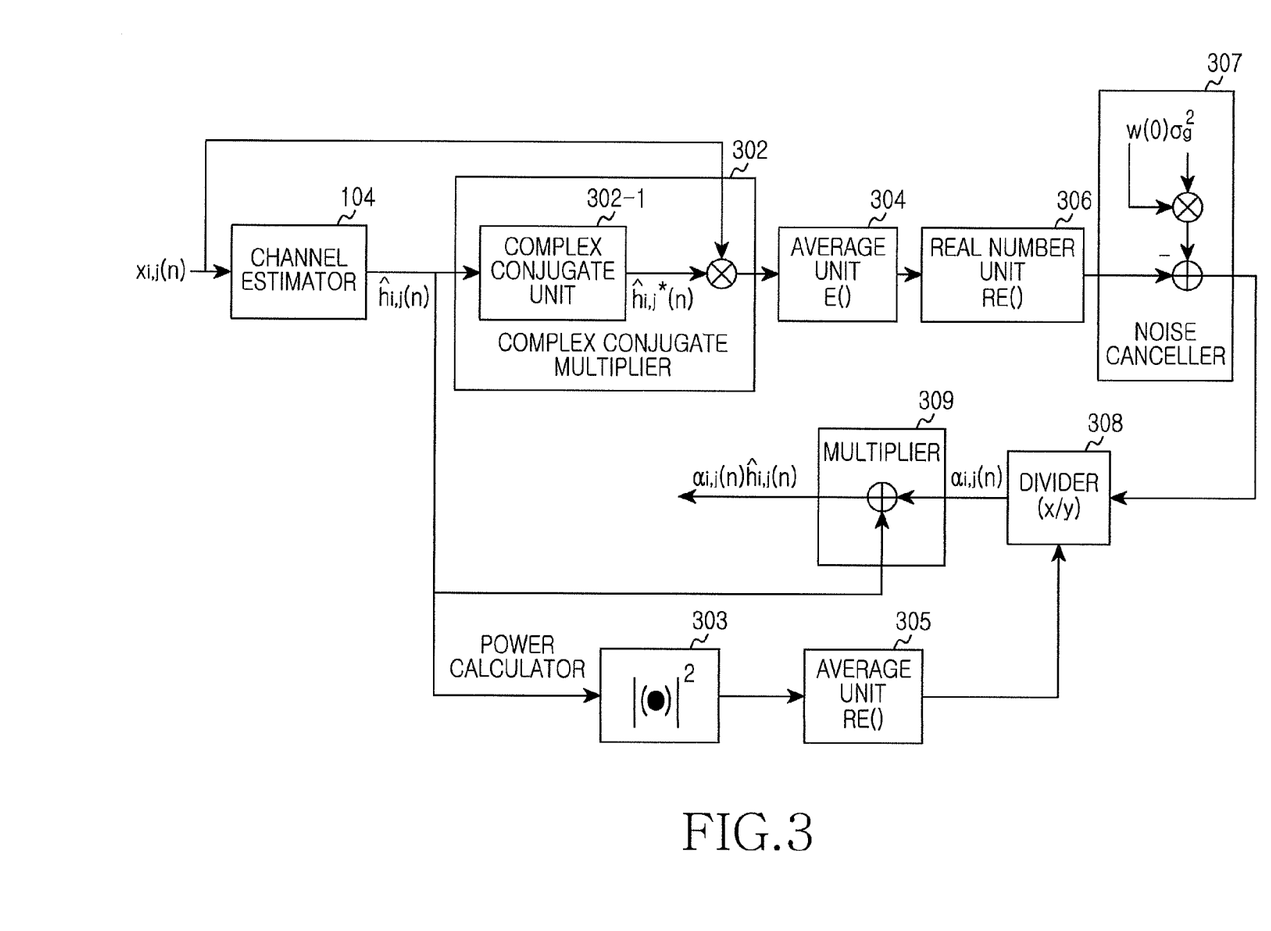
FIG. 3 is a block diagram illustrating a weighting block according to an exemplary embodiment of the present invention.

FIG. 3 is a block diagram illustrating a weighting block according to an exemplary embodiment of the present invention.

Referring to FIG. 3, the weighting block includes a complex conjugate multiplier 302, a power calculator 303, averaging units 304 and 305, a real number unit 306, a noise canceller 307, a divider 308, and a multiplier 309. The complex conjugate multiplier 302 includes a complex conjugate unit 302-1 for outputting a complex conjugate of an input value.

The complex conjugate unit 302-1 of the complex conjugate multiplier 302 obtains a complex conjugate $h_{i,j}^*(n)$ of an output $h_{i,j}(n)$ of the channel estimator 104, and the complex conjugate multiplier 302 multiplies the obtained complex conjugate $h_{i,j}^*(n)$ and a signal $x_{i,j}(n)$ to be input to the channel estimator 104 to provide a result value thereof to the averaging unit E( ) 304.

The averaging unit 304 obtains an average $E[x_{i,j}(n)h_{i,j}^*(n)]$ for a short time from an output value of the complex conjugate multiplier 302 to provide the same to the real number unit Re( ) 306.

The real number unit Re( ) 306 selects only a real part $Re\{E[x_{i,j}(n)h_{i,j}(n)^*]\}$ from the output $E[x_{i,j}(n)h_{i,j}(n)^*]$ of the averaging unit 304 and provides the same to the noise canceller 307.

The noise canceller 307 cancels a noise from the output $Re\{E[x_{i,j}(n)h_{i,j}(n)^*]\}$ provided by the real number unit 306 and provides a result thereof $Re\{E[x_{i,j}(n)h_{i,j}(n)^*]\}-w(0)\sigma_{i,j}^2$ to the divider 308.

The power calculator 303 determines a square $|\hat{h}_{i,j}(n)|^2$ of an absolute value of an output of the channel estimator 104 and provides the same to the averaging unit E( ) 305.

The averaging unit 305 determines an average $E[|h_{i,j}(n)|^2]$ for a short time from the value $|\hat{h}_{i,j}(n)|$ provided by the power calculator 303 and provides the same to the divider 309.

Here, the averaging units E( ) 304 and 305 perform a function of determining an average for a short time, that is, determining an instantaneous average. The averaging units 304 and 305 may use an IIR filter having a coefficient of $\alpha_{IIR}$ as in FIG. 4 which will be described later.

The divider 308 outputs a value $$\alpha_{i,j}(n) = \frac{\text{Re}\{E[x_{i,j}(n)h_{i,j}(n)^*]\} - w(0)\sigma_{i,j}^2}{E\left[|\hat{h}_{i,j}(n)|^2\right]}$$

obtained by dividing an output $\text{Re}\{E[x_{i,j}(n)h_{i,\hat{j}}(n)^*]\} - w(0)\sigma_{i,j}^2$ of the noise canceller 307 by an output $E[|h_{i,j}(n)|^2]$ of the averaging unit 305.

The multiplier 309 outputs a value $\alpha_{i,j}(n)h_{i,\hat{j}}(n)$ obtained by multiplying an output value $\alpha_{i,j}(n)$ of the divider 308 by an output value $h_{i,\hat{j}}(n)$ of the channel estimator 104.

Figure 4:
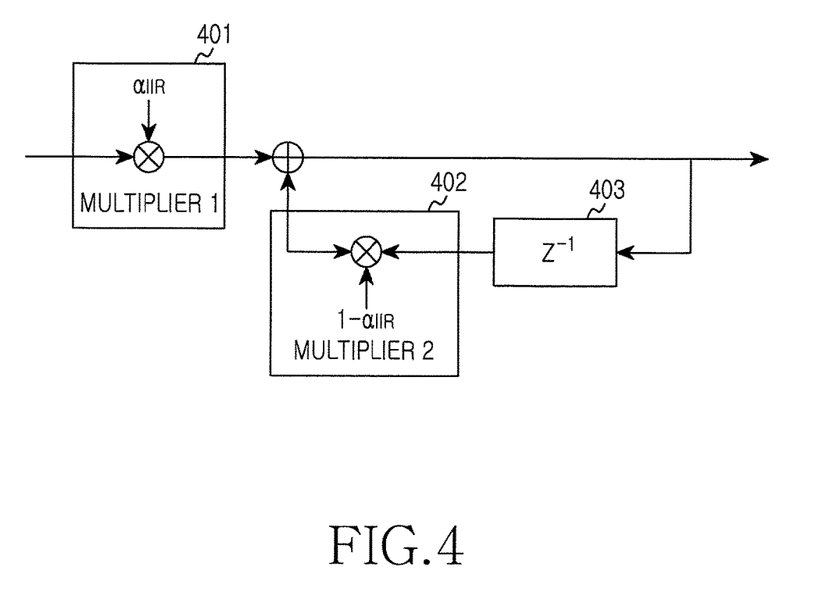
FIG. 4 is a block diagram illustrating an IIR filter for an averaging unit according to an exemplary embodiment of the present invention.

FIG. 4 is a block diagram illustrating an IIR filter for an averaging unit according to an exemplary embodiment of the present invention.

Referring to FIG. 4, the averaging units 304 and 305 include a multiplier 1 401, a multiplier 2 402, and a shift register 403.

The multiplier 1 401 multiplies an input signal by $\alpha_{IIR}$, and the multiplier 2 402 multiplies an output of the shift register 403 by $1-\alpha_{IIR}$.

The output of the multiplier 1 401 and the output of the multiplier 2 402 are added to each other, and the added value is input to the shift register 403.

Generally, the channel estimate value estimated by the channel estimator 104 may be expressed by Equation (1).

$$h_{i,j}(n) = \hat{W}^T X_{i,j}(n) \quad (1)$$

where $W^T$ is a matrix represented by approximation using a FIR filter having a sufficiently large Tap number (=2L+1), and may be expressed by Equation (2).

$$W = \begin{bmatrix} w(L) \\ \vdots \\ w(0) \\ \vdots \\ w(-L) \end{bmatrix} \quad (2)$$

In Equation (2), w(1) is an 1-th channel estimate coefficient when approximation has been performed using a FIR filter.

In addition, in Equation (1), $X_{i,j}(k)$ is an input symbol signal $x_{i,j}(n)$ represented in terms of a matrix and has a structure as in Equation (3).

$$X_{i,j}(n) = \begin{bmatrix} x_{i,j}(n+L) \\ \vdots \\ x_{i,j}(n) \\ \vdots \\ x_{i,j}(n-L) \end{bmatrix} \quad (3)$$

In Equation (3), $x_{i,j}(n)$ may be expressed by Equation (4).

$$x_{i,j}(n) = h_{i,j}(n) + g_{i,j}(n) \quad (4)$$

In Equation (4), $h_{i,j}(n)$ is a channel matrix, and $g_{i,j}(n)$ is a Gaussian noise having a dispersion of $\sigma_{i,j}^2$.

When an MSE is minimized (or reduced) in a short term, an MSE is minimized (or reduced) in a long term, so that a weighting factor $\alpha(n)$ minimizing (or reducing) an MSE for a short term can be determined. An MSE for a short term may be expressed by Equation (5). Here, a unit of a short term denotes a unit of n in Equation.

$$\text{MSE}_{i,j}(n) = E[|h_{i,j}(n) - \alpha_{i,j}(n)h_{i,\hat{j}}(n)|^2] \quad (5)$$

Equation (5) may be changed into Equation (6).

$$\text{MSE}_{i,j}(n) = E[|_{i,j}(n)|^2] - 2\alpha_{i,j}(n)\text{Re}\{E[h_{i,j}(n)h_{i,j}(n)^*]\} + \alpha_{i,j}(n)^3 E[|h_{i,j}(n)|^2] \quad (6)$$

Equation (6) is differentiated to determine $\alpha_{i,j}(n)$ minimizing (or reducing) MSE(n) as in Equation (7).

$$\alpha_{i,j}(n) = \frac{\text{Re}\{E[h_{i,j}(n)h_{i,\hat{j}}(n)^*]\}}{E\left[|\hat{h}_{i,j}(n)|^2\right]} \quad (7)$$

$$= \frac{\text{Re}\{E[x_{i,j}(n)h_{i,\hat{j}}(n)^*]\} - w(0)\sigma_{i,j}^2}{E\left[|\hat{h}_{i,j}(n)|^2\right]}$$

In Equation (7), w(0) is a zero-th coefficient of $W^T$.

Figure 5:
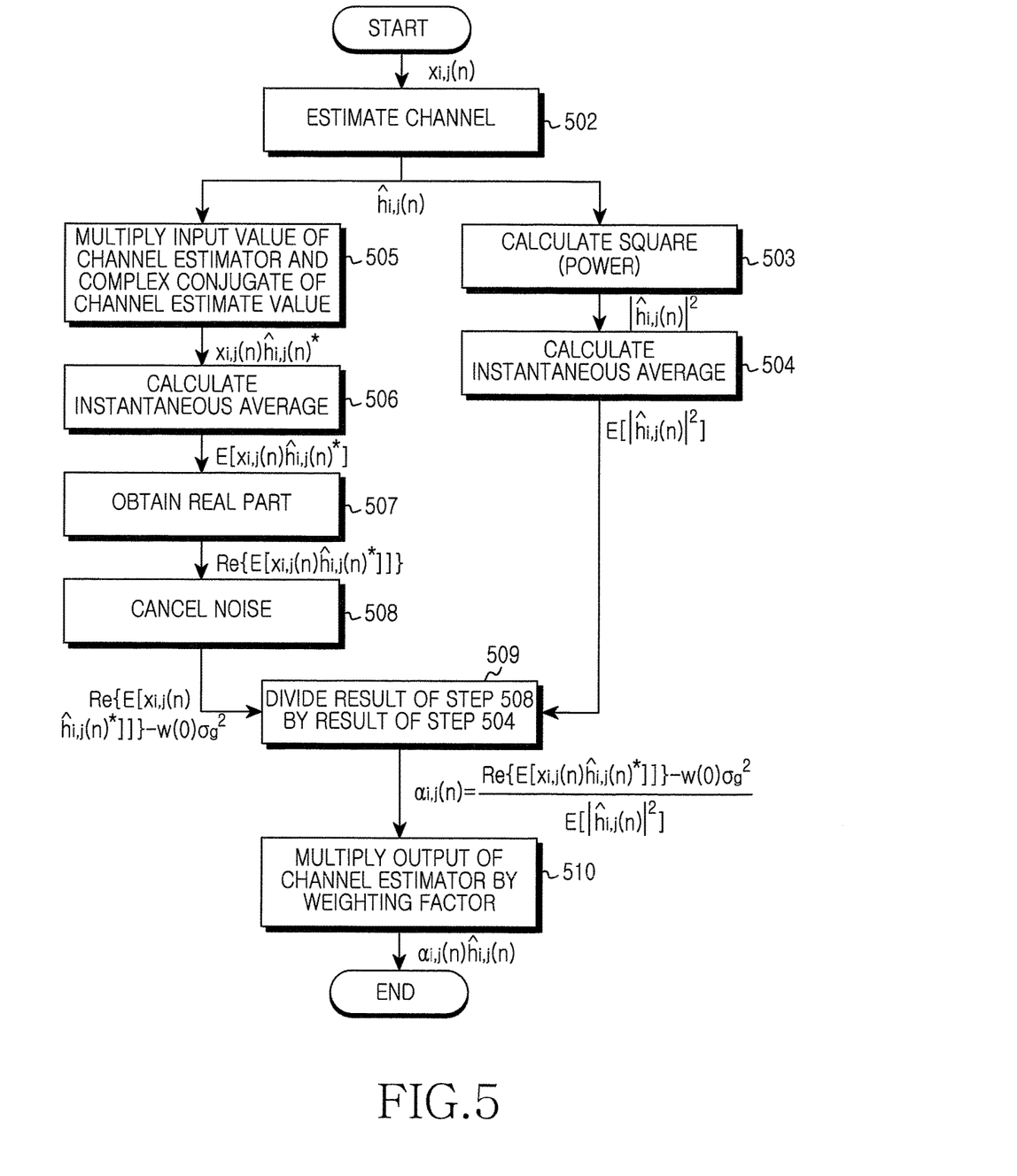
FIG. 5 is a flowchart illustrating a process for determining a weighting factor according to an exemplary embodiment of the present invention.

A flowchart for Equation (7) is illustrated in FIG. 5 which will be described below.

FIG. 5 is a flowchart illustrating a process for determining a weighting factor according to an exemplary embodiment of the present invention.

Referring to FIG. 5, when a weighting factor determining algorithm of the weighting block starts, the channel estimator 104 performs channel estimation using a received signal $x_{i,j}(n)$ and outputs a result value $h_{i,\hat{j}}(n)$ (step 502).

The power calculator 303 determines a square (power) $|h_{i,\hat{j}}(n)|^2$ of an output value of the channel estimator 104 (step 503), and the averaging unit 305 obtains an instantaneous average value $E[|h_{i,\hat{j}}(n)|^2]$ (step 504).

Simultaneously (or at about a similar time) with the processes of steps 503 and 504, a process for determining a numerator of a weighting factor using Equation (7) may be performed (steps 505-508).

The complex conjugate multiplier 302 multiplies an input value $x_{i,j}(n)$ for the channel estimator 104 by a complex conjugate of a channel estimate value $h_{i,\hat{j}}(n)$ and outputs a result value $x_{i,j}(n)h_{i,\hat{j}}(n)^*$ (step 505).

The averaging unit 304 obtains an instantaneous average $E[x_{i,j}(n)h_{i,\hat{j}}(n)^*]$ of an output value of the complex conjugate multiplier 302 (step 506).

The real number unit 306 selects only a real part $\text{Re}\{E[x_{i,j}(n)h_{i,\hat{j}}(n)^*]\}$ from the instantaneous average (step 507).

The noise canceller 307 outputs a value $\text{Re}\{E[x_{i,j}(n)h_{i,\hat{j}}(n)^*]\} - w(0)\sigma_{i,j}^2$ obtained by canceling a noise from an output value of the real number unit 306 (step 508).

The divider 308 divides the output value $\text{Re}\{E[x_{i,j}(n)h_{i,\hat{j}}(n)^*]\} - w(0)\sigma_{i,j}$ of the noise canceller 307 by the output $E[|h_{i,\hat{j}}(n)|^2]$ of the averaging unit 305 and outputs a result value $$\alpha(n) = \frac{\text{Re}\{E[x_{i,j}(n)h_{i,j}(n)^*]\} - w(0)\sigma_{i,j}^2}{E\left[|\hat{h}_{i,j}(n)|^2\right]}$$

(step 509).

The multiplier 309 multiplies the output $h_{i,\hat{j}}(n)$ of the channel estimator 104 by the determined weighting factor $\alpha(n)$ and outputs a result thereof $\alpha_{i,j}(n)h_{i,\hat{j}}$ (step 510).

Since exemplary embodiments of the present invention use a structure that applies an instantaneously optimized (or improved) weighting factor without using a structure that uses a constant weighting factor, they may prevent a problem that an MSE gets large. In addition, exemplary embodiments of the present invention reduce remaining pilot power when canceling a pilot interference by improving an MSE performance of a channel estimator used in a PIC. Since quality of a signal from which a pilot has been cancelled improves, a cell throughput of an uplink improves.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a receiver to perform a pilot interference cancellation (PIC) in a wireless communication system, the method comprising:
    generating symbol signals of a signal received from a transmitter, in symbol units;
    determining a channel gain for each symbol by estimating a channel between the transmitter and the receiver based on each of the symbol signals;
    determining a weighting factor for each symbol, based on each of the symbol signals and the channel gain for each symbol, to minimize a mean square error (MSE) between the channel and a multiplication of the weighting factor and the determined channel gain in the each symbol;
    determining a pilot by using the channel gain and the determined weighting factor; and
    generating an output signal by cancelling the determined pilot from the signal,
    wherein the weighting factor is determined to minimize the MSE by differentiating an equation:

$$MSE_{i,j}(n) = E[|h_{i,j}(n) - \alpha_{i,j}(n)\hat{h}_{i,j}(n)|^2]$$

wherein the $MSE_{i,j}(n)$ represents the MSE, $h_{i,j}(n)$ represents the channel, $\hat{h}_{i,j}(n)$ represents the channel gain by estimating the channel, $\alpha_{i,j}(n)$ is the weighting factor, 'n' represents n-th symbol signal, 'i' represents a user of the transmitter, and 'j' represents j-th finger of the receiver,
    wherein determining the weighting factor comprises:
    determining a first value by multiplying each of the symbol signals and a complex conjugate of the determined channel gain;
    determining a second value by averaging the first value in each symbol;
    determining a third value by extracting a real part from the second value;
    determining a fourth value by cancelling a noise from the third value; and
    determining the weighting factor by multiplying the fourth value and a power value,
    wherein the power value is determined by averaging a power of the channel gain for each symbol,
    wherein the weighting factor is determined by an equation:

$$\alpha_{i,j}(n) = \frac{\text{Re}\{E[x_{i,j}(n)\hat{h}_{i,j}(n)^*]\} - w(0)\sigma_{i,j}^2}{E[|\hat{h}_{i,j}(n)|^2]},$$

and
    wherein $x_{i,j}(n)$ represents n-th symbol signal, $\hat{h}_{i,j}(n)$ represents the channel gain for the n-th symbol signal, $w(0)\sigma_{i,j}^2$ represents a noise, n represents n-th symbol signal, $E[\cdot]$ represents averaging an input in each symbol, 'i' represents a user of the transmitter, and 'j' represents j-th finger of the receiver.

2. The method of claim 1, wherein generating the symbol signals comprises:
    over-sampling a received sample of the signal;
    generating a pseudo noise (PN) sequence; and
    generating the symbol signals by despreading the over-sampled sample by a spreading factor (SF).

3. The method of claim 2 wherein the determined pilot is generated based on the channel gain, the weighting factor, and the PN sequence.

4. The method of claim 1, wherein the second value is determined by using an infinite impulse response (IIR) filter.

5. The method of claim 1, wherein determining the pilot comprises:
    generating a pseudorandom noise (PN) sequence for a user of the transmitter; and
    determining the pilot for the user based on the generated PN sequence for the user, the channel gain for the user, and the determined weighting factor for the user.

6. An apparatus of a receiver to perform a pilot interference cancellation (PIC) in a wireless communication system, the apparatus comprising:
    at least one transceiver configured to receive a signal from a transmitter; and
    at least one processor configured to:
    generate symbol signals of the signal, in symbol units;
    determine a channel gain for each symbol by estimating a channel between the transmitter and the receiver based on each of the symbol signals;
    determine a weighting factor for each symbol, based on each of the symbol signals and the channel gain for each symbol, to minimize a mean square error (MSE) between the channel and a multiplication of the weighting factor and the determined channel gain in the each symbol;
    determine a pilot by using the channel gain and the determined weighting factor;
    generate an output signal by cancelling the determined pilot from the signal,
    wherein the weighting factor is determined to minimize the MSE by differentiating an equation:

$$MSE_{i,j}(n) = E[|h_{i,j}(n) - \alpha_{i,j}(n)\hat{h}_{i,j}(n)|^2]$$

wherein the $MSE_{i,j}(n)$ represents the MSE, $h_{i,j}(n)$ represents the channel, $\hat{h}_{i,j}(n)$ represents the channel gain by estimating the channel, $\alpha_{i,j}(n)$ is the weighting factor, 'n' represents n-th symbol signal, 'i' represents a user of the transmitter, and 'j' represents j-th finger of the receiver,
    wherein the at least one processor, in order to determine the weighting factor, is configured to:
    determine a first value by multiplying each of the symbol signals and a complex conjugate of the determined channel gain;
    determine a second value by averaging the first value in each symbol;
    determine a third value by extracting a real part from the second value;
    determine a fourth value by cancelling a noise from the third value; and determine the weighting factor by multiplying the fourth value and a power value, wherein the power value is determined by averaging a power of the channel gain for each symbol, wherein the weighting factor is determined by an equation:

$$\alpha_{i,j}(n) = \frac{\text{Re}\{E[x_{i,j}(n)\hat{h}_{i,j}(n)^*]\} - w(0)\sigma_{i,j}^2}{E[|\hat{h}_{i,j}(n)|^2]},$$

and wherein $x_{i,j}(n)$ represents n-th symbol signal, $h_{i,j}(n)$ represents the channel gain for the n-th symbol signal, $w(0)\sigma_{i,j}^2$ represents a noise, n represents n-th symbol signal, $E[\bullet]$ represents averaging an input in each symbol, 'i' represents a user of the transmitter, and 'j' represents j-th finger of the receiver.

7. The apparatus of claim 6, further comprising:
an interpolator configured to over-sample a received sample of the signal;
a pseudo noise (PN) generator configured to generate a PN sequence; and
a despreader configured to generate the symbol signals by despreading the over-sampled sample by a spreading factor (SF).

8. The apparatus of claim 7, wherein the determined pilot is generated based on the channel gain, the weighting factor, and the PN sequence.

9. The apparatus of claim 6, wherein the second value is determined by using an infinite impulse response (IIR) filter.

10. The apparatus of claim 6, wherein the at least one processor, in order to determine the pilot, is configured to:
generate a pseudorandom noise (PN) sequence for a user of the transmitter; and
determine the pilot for the user based on the generated PN sequence for the user, the channel gain for the user, and the determined weighting factor for the user.

* * * * *